United States Patent [19]

Ely

[11] Patent Number: 4,462,698

[45] Date of Patent: Jul. 31, 1984

[54] NONCONTACT TEMPERATURE SENSING METHOD AND APPARATUS FOR LADLE PREHEATING

[75] Inventor: Robert T. Ely, Pittsburgh, Pa.

[73] Assignee: Bloom Engineering Company, Inc., Pittsburgh, Pa.

[21] Appl. No.: 370,366

[22] Filed: Apr. 21, 1982

[51] Int. Cl.³ .............. G01J 5/08

[52] U.S. Cl. .............. 374/125; 222/593; 356/43

[58] Field of Search .............. 374/120, 125, 121, 130, 374/132, 123, 124; 222/593, 590; 65/326; 164/150; 431/13; 356/43, 44; 250/353, 347

[56] References Cited

U.S. PATENT DOCUMENTS

| | | | |
|---|---|---|---|
| 2,418,845 | 4/1947 | Long | 431/13 X |
| 3,091,694 | 5/1963 | Goodridge | 250/353 |
| 3,584,509 | 6/1971 | Compton et al. | 374/125 X |
| 3,970,444 | 7/1976 | Brotzmann et al. | 222/590 X |

FOREIGN PATENT DOCUMENTS

| | | | |
|---|---|---|---|
| 1245794 | 10/1960 | France | 374/121 |

*Primary Examiner*—Jerry W. Myracle

*Attorney, Agent, or Firm*—Webb, Burden, Robinson & Webb

[57] ABSTRACT

A ladle preheat station includes a wall, a ladle base for holding a ladle juxtapositioned to the wall on one side thereof, and burner extending through the wall for firing into the ladle interior. The wall includes a sight tube extending therethrough. An infrared pyrometer is mounted and spaced from the side of the wall opposite the ladle and is positioned to transmit a signal through the sight tube to measure the radiation of the ladle bottom and convert it into an electrical signal for control purposes.

9 Claims, 3 Drawing Figures

NONCONTACT TEMPERATURE SENSING METHOD AND APPARATUS FOR LADLE PREHEATING

FIELD OF THE INVENTION

My invention relates to a method and apparatus for measuring and controlling preheated ladle temperatures and more particularly to noncontact direct ladle temperature measurements.

DESCRIPTION OF THE PRIOR ART

Ladles which are used in the metal industry serve the purpose of transporting or storing molten metal prior to further processing. The ladles are refractory lined and are preheated prior to use to minimize cooling of the molten product. In addition, ladle lining repairs and the relining of entire ladles require preheating for drying purposes. Normally ladles are preheated by combustion systems called ladle stations which fire natural gas or fuel oil as a combustion product into the cavity of the ladle. Typically, the ladles are moveable and are preheated at the ladle stations. In other cases such as a tundish, which is at a fixed location, portable ladle stations are employed which are moveable to the fixed location.

While it has been recognized for some time that the ladle temperature is critical to the quality of the product and the life of the lining, in recent years it has also been recognized that overheating or underheating can result in tremendous wastes of energy. This energy waste is not only defined by the energy input of the ladle stations themselves but by the overall furnace temperature of the melting furnace which ultimately compensates for poorly heated ladles. It has been estimated by some that furnace tap temperatures may be reduced by as much as 75° when ladles which have been uniformly heated at the appropriate temperature are used.

Heretofore, ladle temperatures have been controlled by standard thermocouples which measure the atmospheric temperature inside the ladle. However, the atmosphere around the thermocouple is not a true representation of the actual lining temperature of the ladle. In addition, the thermocouple is affected by infiltration of air between the ladle lip and the ladle station wall which houses the burner. As the gap between the ladle lip and the wall varies from heating to heating, so does the relationship between the thermocouple temperature and the actual ladle surface temperature. In addition, the thermocouple sticks outwardly, a distance on the order of 6-8 inches, from the ladle station wall into the area of the ladle and is therefore subject to damage from the ladle and from the slag buildup which is routinely present on the lip of the ladle.

SUMMARY OF THE INVENTION

My invention eliminates all of the inaccuracies associated with measuring the atmosphere within the ladle interior by means of a thermocouple. In addition, it eliminates the protuberance of a temperature measuring device into the area of the ladle interior where it is subject to damage. My invention also reduces flame interference problems thereby providing a means of giving a true and reproducible ladle refractory temperature. My invention further eliminates the sensitivity of the temperature measuring device to the gap, if any, formed between the ladle lip and the preheat ladle station wall.

My invention employs a noncontact direct ladle temperature measuring system employing an infrared pyrometer as the radiation measuring device. The pyrometer operates at a selected wavelength which reduces flame interference and uses a silicon cell detector capable of withstanding high ambient temperatures. A sight port through the preheat station wall is provided for the radiation path. The pyrometer is positioned behind and protected by the ladle station wall and is spaced therefrom. The sight port allows the radiation signal to pass while at the same time isolating the sensing unit from actual contact with the hot products of combustion. This is accomplished by use of a pyrex window cap which allows the waveband to pass while reducing the heat transfer. A further purge assembly applies a positive pressure away from the window thereby eliminating any hot gases from contaminating the window surface. My pyrometer is mounted on a dual bracket assembly for supporting and aligning the pyrometer in the X, Y and Z planes.

DESCRIPTION OF THE PREFERRED EMBODIMENTS

Figure 1:
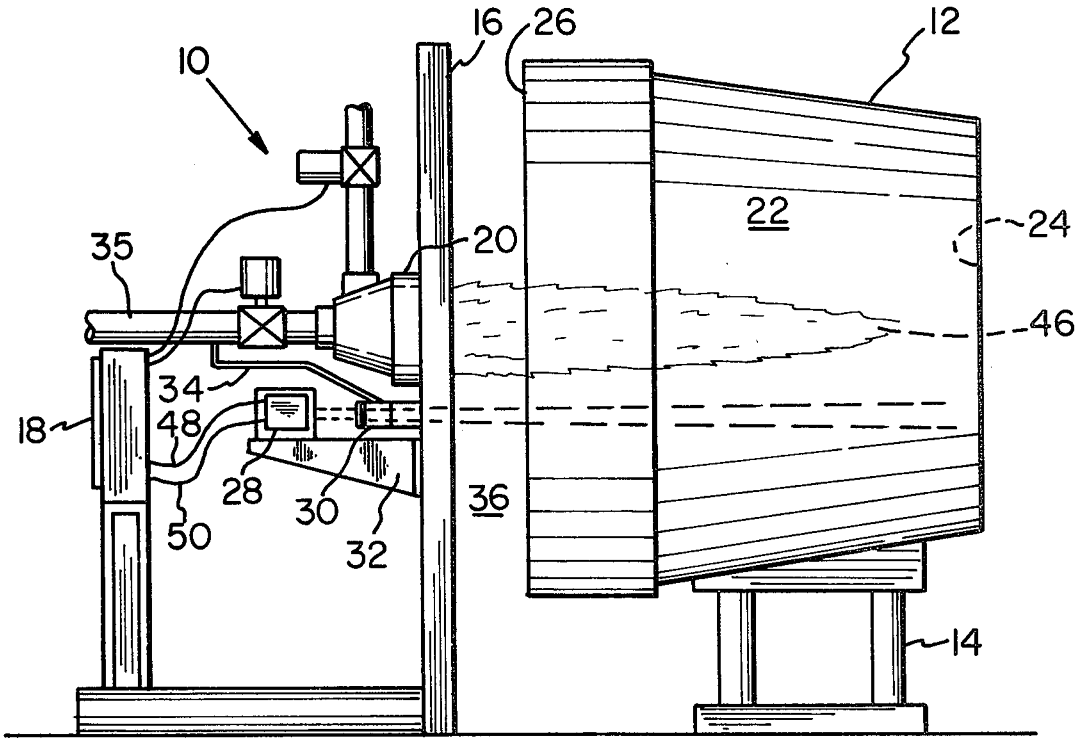
FIG. 1 is a side elevation of a ladle preheat station embodying my invention.

The ladle preheat station, generally designated 10, is illustrated as a horizontal type where a ladle 12 is maintained in the horizontal position on a ladle stand 14 during heating FIG. 1. It will be recognized that subject invention is applicable to vertical, horizontal and tipped position ladle preheat stations for portable ladles as well as to portable ladle stations in the form of roofs which are employed with permanently positioned ladles such as tundishes and the like.

The ladle preheat station 10 includes an upstanding refractory lined wall 16 through which a burner 20 directs a flame 46 into the interior 22 of ladle 12, FIG. 1. In the illustrated station 10 the ladle rim 26 is shown spaced from the wall 16 so as to permit the products of combustion to exit the ladle interior 22. A number of systems have been suggested and employed in which the exit products of combustion are used to preheat the air to the burner in heat exchange relationship through recuperators and the like. These systems include forming a seal between the ladle and the wall as well as systems which maintain a gap therebetween.

Figure 2:
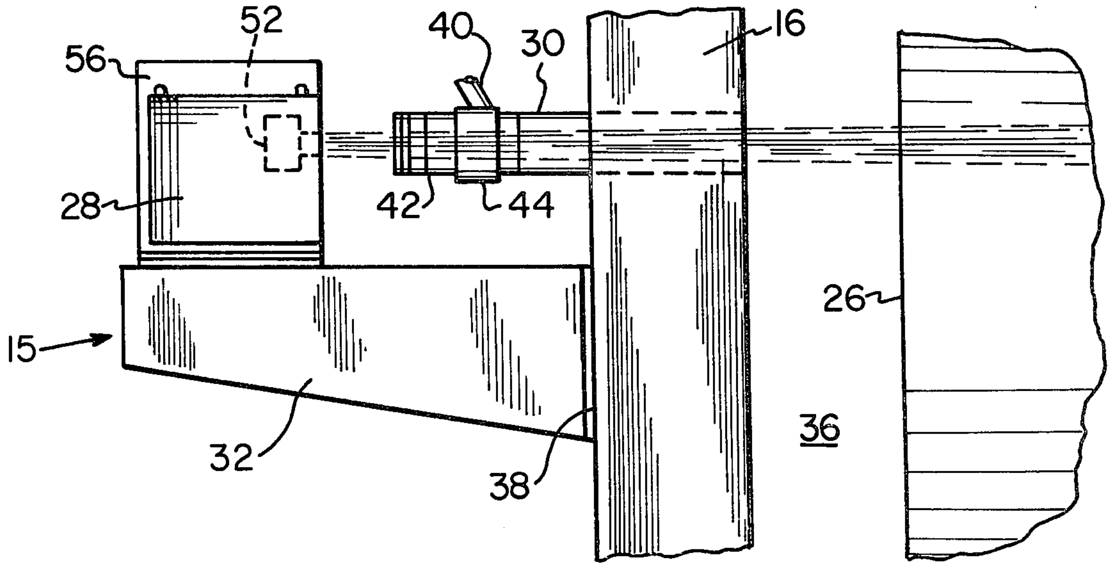
FIG. 2 is a close-up side elevation of my noncontact temperature sensing system.

My noncontact pyrometer 28 is mounted on a bracket 15 which in turn is mounted to the rear of the wall 16 in protected relationship from the ladle 12, FIG. 2. A sight tube 30 extends through the wall in line with the radiation detector 52 of the pyrometer and generally below the burner 20 so as to avoid direct flame reflection. Sight tube 30 can be of any appropriate material, e.g. stainless steel type 304, and it can be secured to wall 16 such as be welding.

Figure 3:
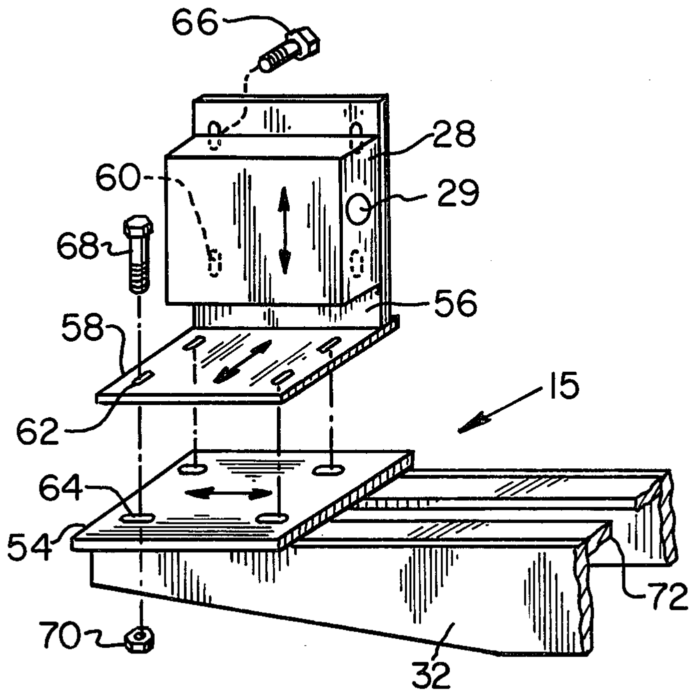
FIG. 3 is an exploded view showing the dual bracket assembly for support and alignment of my noncontact temperature measuring device.

Bracket 15 to which the radiation pyrometer 28 is mounted is a special dual bracket allowing adjustment in the X, Y and Z directions, FIGS. 2 and 3. Specifically, a pair of support brackets 32 extend in parallel relationship and rearwardly of wall 16. Each bracket 32 terminates in a flange 38 which can be welded or otherwise attached to the rear of wall 16. Brackets 32 also include a horizontal flange 72 to which the adjustable part of the bracket 15 is attached as described hereinafter.

The X plate 54 includes four slots 64, each having its longitudinal axis extend in the direction of the support brackets 32, FIG. 3. The Z plate 58 includes four slots 62, each having its longitudinal axis extend in a direction transverse of the support brackets 32. X plate 54 and Z plate 58 are mounted atop one another with the respective slots 64 and 62 being aligned so as to accommodate bolts 68. The slots 62 and 64 align with slots (not shown) in the horizontal flanges 72 of the brackets 32. The bolts 68 extend through the various slots and threadably engage nuts 70 to connect the plates 54 and 58 to the brackets 32. Loosening of bolts 68 permit plates 54 and 58 to be adjusted in the X and Z direction respectively as the plates are free to be moved a distance limited by the length of their respective slots.

Extending upward from and mounted to, such as by welding, the Z plate 58 is the Y plate 56, FIG. 3. Y plate 56 includes four slots 60 each having its longitudinal axis extend in the vertical direction. The pyrometer 28 is mounted by means of bolts 66 with each bolt 66 extending through a slot 60 and threadably engaged into the side of the pyrometer 28. Loosening of the bolts 66 permits the pyrometer to be adjusted in the vertical direction (Y axis) a distance limited by the length of slots 60.

The pyrometer 28 is a high temperature sensor which includes a silicon cell detector 52 which operates in the infrared range so as to reduce flame interference problems. Further, by positioning the pyrometer below the burner means of the wall flame interference is further reduced. The pyrometer is filtered in the 0.8 to 1.0 micron region where accurate readings of incandescent temperature can be made with minimum error due to unknown or varying emissivity.

The sight tube 30 has a port opening calculated for the proper diameter to allow sufficient radiation to reach the pyrometer 28. The port opening allows radiation to pass while at the same time isolating the sensing unit from actual contact with hot products of combustion. This is accomplished by means of a pyrex window cap (lens) 42 mounted in the end of the sight tube 30 which allows the waveband to pass while reducing the heat transfer, FIG. 2. To further maintain the pyrex window 42, a purge system is provided with the sight tube 30. The purge system includes a purge collar 44 surrounding the sight tube 30 and through which a purge tube 40 extends. Air is introduced through the purge tube 40 into the sight tube 30 in spaced relationship to lens 42 to prevent fogging thereof. The purge line 34 which connects to the purge tube 40 connects to the air duct 35 which feeds the burner means 20, FIG. 1.

In operation, the X, Y and Z plates are adjusted so that the silicon detector 52 is emitting a signal through the sight tube 30 so as to read the radiation off the bottom 24 of the ladle 12, FIG. 1. A pair of flexible conduits 48 and 50 direct power into and out of respectively, the pyrometer 28 and the control board 18. The use of the two conduits reduces radio frequency and noise interference. The pyrometer 28 measures the radiation of the ladle surface and converts the measured signal into a corresponding linear electrical output signal. The output signal relates directly to the ladle temperature and manual or automatic controls can be used to operate the burner 20. The controls are standard and do not form a part of the subject invention.

It will be recognized that the noncontact pyrometer and control system can also be used in conjunction with a thermocouple. Where a thermocouple is also employed, it is usually utilized to calculate rough temperatures up to 1500° F. whereas the radiation pyrometer detects temperatures thereabove and normally in the range of 1800° to 2200° which is the normal desired temperature range for preheating ladles.

The use of my apparatus and method allows for close control of the energy input into heating the ladle since accurate and reproducible actual ladle lining temperatures are obtained and a large heating safety factor is not required. This also provides for a prolonged ladle life and may reduce tapping temperatures since latent heat from the melt is not needed to compensate for poorly heated ladles.

I claim:

1. In a ladle heating apparatus in which a ladle and a wall are juxtapositioned so that burner means associated with the wall fire through a ladle opening and into an interior thereof for preheating purposes, the improvement comprising a sight tube extending through said wall, a noncontact radiation pyrometer mounted to the wall for sighting through said sight tube and measuring the radiation of a ladle interior surface and adjustment means connecting the radiation pyrometer to the wall to permit adjustment of the pyrometer to sight on the ladle bottom.

2. The improvement of claim 1, said pyrometer operable within the infrared range.

3. The improvement of claim 1, said adjustment means comprising a bracket mounted to the wall on a side opposite the ladle side, said pyrometer mounted to said bracket and adjustable in the X, Y and Z planes.

4. The improvement of claims 1, 2 or 3 including a protective lens mounted in the sight tube.

5. A ladle reheat station including a wall, a ladle base for holding a ladle juxtapositioned to the wall on one side thereof, a burner means extending through the wall for firing into a ladle interior, a sight tube including a protective lens extending through said wall, an infrared pyrometer adjustably mounted to and spaced from an opposite side of said wall and positioned to measure radiation off a ladle bottom surface through said sight tube.

6. The station of claim 5, including a bracket extending from said wall for mounting said pyrometer so as to be adjustable in the X, Y and Z planes.

7. The station of claim 6, said sight tube mounted below said burner means so as to avoid flame reflection from said burner means.

8. The station of claim 6, said bracket including a first plate having slots extending in the Y plane, a second plate having slots extending in the X plane and a third plate having slots extending in the Z plane, said pyrometer mounted to one of said plates and adjustably moveable within its slots and the other two of said plates being connected and adjustably moveable in relation to each other.

9. The station of claim 5, including a purge tube connected to said sight tube to apply a positive pressure spaced from the lens and eliminate hot gas contamination of the lens surface.

* * * * *